UNITED STATES PATENT OFFICE 2,412,213

METHOD OF PRODUCING STARCH ESTERS

Martinus Gerardus Groen, Hoogezand, Netherlands; vested in the Alien Property Custodian No Drawing. Application March 28, 1940, Serial No. 326,497. In The Netherlands December 12, 1938

3 Claims. (Cl. 260—234)

Several methods for the production of fatty acid esters, more particularly acetic acid esters, from starch have been proposed. These esters have properties which are similar to those of the cellulose esters and therefore may be used to a certain extent for the same purpose. Up to the present, however, it has not been possible to obtain a satisfactory yield of starch esters having a sufficient degree of esterification, i. e. that contain at least 2½ acyl groups per molecule of $C_6H_{10}O_5$.

In general starch in gelatinized condition is very hard to esterify with acids or acid anhydrides, while moreover by the high temperature required for this esterification there are formed products which, on account of the decomposition of the starch molecules, have become partly water soluble and therefore are inferior from a technical point of view. The production of formic acid esters is easier; these esters, however, are unstable and are technically of minor importance. It is also possible to produce starch esters by means of acid chlorides in the presence of organic bases.

It is known that esterification will proceed more readily, if the starch has been previously gelatinized or brought into a soluble form. It has been proposed, among other things, to subject the starch before the conversion into fatty acid esters to a swelling treatment with chloroacetic acid or alternatively to bring the starch into a soluble form by the action of glycerol at 160° C. The action of the catalysts generally used in acetylating processes, such as hydrohalogenic acids, sulfuric acid, aluminum chloride, zinc chloride and the like, is also to be considered as being chiefly due to their property of rendering the starch soluble. These catalysts are not very suitable for the preparation of technically valuable starch esters, as they generally are apt to decompose the starch too far, and the yield is generally too low.

The formic acid esters mentioned above are easily produced, since starch is soluble in concentrated formic acid. If this solution is treated with acetic acid and acetic acid anhydride, there will be formed an ester which contains a formyl group and an acetyl group in each molecule of $C_6H_{10}O_5$, but which will not dissolve in organic solvents, so that these products also are as yet of little value in actual practice.

According to the invention it is possible to prepare technically valuable esters from starch with fatty acids and/or hydroxy fatty acids by treating the starch which has been dissolved in an anhydrous medium in the presence of an acetate with the acids in question, or with the anhydrides thereof.

A solution suitable for this purpose may be obtained in the manner described above with the aid of formic acid. It has been found that when treating such a solution with e. g. acetic acid anhydride or with a mixture of acetic acid and acetic acid anhydride in the presence of sodium acetate a substantial decomposition of the starch will not occur, even at high temperatures, and that products are obtained thereby that are esterified to a very high degree and contain e. g. 2.8 acetyl groups.

It is, however, also possible to start from other starch solutions in an anhydrous medium. According to an embodiment of the invention the starch is dissolved in a mixture of ammonium acetate and acetamide and subsequently acylated with acid anhydrides or mixtures of acids and acid anhydrides. The mixture of ammonium acetate and acetamide may be obtained by saturating acetic acid anhydride with ammonia gas, and it has been found that starch may be readily dissolved in this mixture at a temperature of e. g. 140° C. By the acylation of the dissolved starch the esters are produced in a substantially theoretical yield; the composition of the esters depends i. a. on the proportion of the acylating agent, the temperature and the time of reaction.

The reaction may be promoted by distilling off, preferably in vacuo, the water formed, by the reaction either during the treatment or during the first phase of the said treatment.

By the acylation described above a yield of 95% of esters containing up to 2.8 acyl groups, e. g. acetyl groups, is obtained. Efforts to obtain the pure triacetates by using a larger proportion of acetic acid anhydride have failed because of an initial saponification. It has been found, however, that by adding per-compounds, especially hydrogen peroxide, at the end of the reaction it is possible to produce the tri-ester without any difficulty, which most likely is due to the formation of per-acetic acid. Moreover, the hydrogen peroxide has a bleaching action, so that very light colored esters are obtained.

The use of sodium acetate as a catalyst in acetylating processes is not novel per se; this catalyst, however, has not yet been used for producing starch esters containing more than 2.5 acyl groups.

*Example*

100 parts by weight of acetic acid anhydride are saturated with dry ammonia gas. In the reaction mixture 30 parts by weight of anhydrous sodium acetate and 32 parts by weight of dried potato starch are dissolved. The mixture is heated to 140° C. for one and a half hours, and 50 parts by weight of acetic acid anhydride are slowly added while agitating. After the agitating treatment has been continued for an hour, the water is distilled off in vacuo, after which the addition of acetic acid anhydride is continued until 100 parts by weight have been added in total. When pouring the reaction mixture into water an ester containing from 2.5 to 2.75 acetyl groups is obtained.

The treatment is preferably continued, however, by further agitating the reaction mixture without heating, prior to pouring the same into water and by adding 35 parts by weight of a 5% solution of hydrogen peroxide and 5 parts by weight of acetic acid anhydride. The reaction mixture which will be very light in color is left over night and then poured into water, whereby the tri-ester is precipitated. The precipitate is washed and dried subsequently. This ester is perfectly soluble in organic solvents and the solutions are homogeneously miscible with solutions of acetyl cellulose.

Besides fatty acids such as acetic acid one may also use hydroxy fatty acids, e. g. lactic acid, for the esterification. It is possible in this manner to prepare mixed esters, in which the hydroxy groups of the starch are esterified e. g. partly with lactic acid and partly with acetic acid.

The method according to the invention is chiefly important for the production of highly esterified products from non-converted starch, particularly potato starch. It is also possible, if desired, to start from starch products which have been subjected to a treatment whereby esters are produced the properties of which are more or less different from those of the esters of the original starch. Very suitable products may be prepared e. g. from cold swelling starches.

I claim:

1. A method of producing starch esters containing at least 2.5 acyl groups per molecule of starch, which comprises esterifying a solution of starch in an anhydrous medium consisting of an admixture of ammonium acetate and acetamide at elevated temperatures with an acylating agent, selected from the group consisting of the lower fatty acids and the lower hydroxy fatty acids, the proportion of the acylating agent used being sufficient to supply the said 2.5 acyl groups per molecule of starch.

2. A method of producing starch esters containing at least 2.5 acyl groups per molecule of starch, which comprises esterifying a solution of starch in an anhydrous medium consisting of an admixture of ammonium acetate and acetamide at elevated temperatures with an acylating agent, selected from the group consisting of the lower fatty acids and the lower hydroxy fatty acids, the proportion of the acylating agent used being sufficient to supply the said 2.5 acyl groups per molecule of starch and distilling off the water from the reaction mixture at least during part of the reaction.

3. A method of producing starch esters containing at least 2.5 acyl groups per molecule of starch, which comprises esterifying a solution of starch in an anhydrous medium consisting of an admixture of ammonium acetate and acetamide at elevated temperatures with an acylating agent, selected from the group consisting of the lower fatty acids and the lower hydroxy fatty acids, the proportion of the acylating agent used being sufficient to supply the said 2.5 acyl groups per molecule of starch and, at least during the latter part of the reaction, in the presence of hydrogen peroxide.

MARTINUS GERARDUS GROEN.